US006971757B2

(12) United States Patent
Ro

(10) Patent No.: US 6,971,757 B2
(45) Date of Patent: Dec. 6, 2005

(54) MECHANISM FOR ADJUSTING MIRROR OF AUTOMOTIVE OUTSIDE MIRROR ASSEMBLY

(75) Inventor: Hyuk-Joon Ro, Koyang-si (KR)

(73) Assignee: Pro Quip International Korea Co., Ltd., Kyounggi-do (KR)

( * ) Notice: Subject to any disclaimer, the term of this patent is extended or adjusted under 35 U.S.C. 154(b) by 0 days.

(21) Appl. No.: 11/009,287

(22) Filed: Dec. 9, 2004

(65) Prior Publication Data

US 2005/0128612 A1    Jun. 16, 2005

(30) Foreign Application Priority Data

Dec. 16, 2003 (KR) ........................ P 2003-0091769

(51) Int. Cl.[7] .............................................. G02B 7/82
(52) U.S. Cl. ........................ 359/879; 359/872; 248/477
(58) Field of Search ........................ 359/838, 871–874, 359/876, 877, 879, 880; 248/468, 475.1, 248/476–479, 481–487, 489, 495, 496

(56) References Cited

U.S. PATENT DOCUMENTS 5,042,932 A * 8/1991 Pent ............................ 359/874

6,168,279 B1 * 1/2001 Schnell ........................ 359/872

* cited by examiner

Primary Examiner—Euncha P. Cherry
(74) Attorney, Agent, or Firm—Mitchell P. Brook, Esq.; Luce, Forward, Hamilton & Scripps LLP

(57) ABSTRACT

The present invention relates generally to an automotive outside mirror assembly, and in particular, to a mirror adjustment mechanism with a compact and slim structure, allowing a precise adjustment of the mirror over a wider adjustment angle. A mirror adjustment mechanism as per the present invention comprises, a lower base fixed at a specified position in the mirror housing; an upper base to be combined with upper part of the lower base; a driving unit to be installed between the upper base and the lower base; an adaptor including a partial sphere shape center part; a pivot link which is installed between center parts of the upper base and the adaptor to limit the adaptor to make rotation movements around a first rotation axis and a second rotation axis formed orthogonal to each other on the plane part of the adaptor; a pivot cup comprising a hemisphere part that fits into center part of the adaptor, a spring retainer with which combination protrusions of the pivot cup are combined by a turn movement; a spring which is mounted pressurized between the lower base and the spring retainer as the pivot cup is combined with the spring retainer by a turn movement; and a mirror position sensor unit to be combined with upper side of the lower base.

6 Claims, 8 Drawing Sheets

MECHANISM FOR ADJUSTING MIRROR OF AUTOMOTIVE OUTSIDE MIRROR ASSEMBLY

TECHNICAL FIELD

The present invention relates generally to an automotive outside mirror assembly, and in particular, to a mirror adjustment mechanism with a compact and slim structure, allowing a precise adjustment of the mirror over a wider adjustment angle.

BACKGROUND OF THE INVENTION

Automotive outside mirror assemblies are automotive parts usually installed at both sides of an automobile right ahead of the two front doors to allow a driver to view the traffic conditions at both sides as well as at rear side of the automobile without the need of turning his neck.

Such an outside mirror assembly comprises in the housing thereof an adjustment mechanism that allows the driver in the cabin to control the mirror to direct upward/downward and/or leftward/rightward, and the mirror adjustment mechanism can be classified into a power drive type that requires a power supply and a manual drive type that is driven manually by the driver.

A power drive type mirror adjustment mechanism comprises a mirror position controller installed in the cabin, two driving motors each of which is electrically connected to the above position controller, two adjustment members each of which is geared with the corresponding driving motor via a transmission mechanism such as gear train to control position of the mirror, and sensors that sense position of the mirror while connected to a transmission mechanism between the driving motors and the adjustment members, and then, transmit the sensed position to the mirror position controller.

However, the above conventional mirror adjustment mechanism has problems stated below:

Firstly, a conventional mirror adjustment mechanism allows a relatively narrow adjustment angle of 20° to 25° so that a convenient angle of view allowing a wide left/right as well as a rear viewing cannot be provided for a driver.

Secondly, a conventional mirror adjustment mechanism requires a relatively large installation space in a mirror housing as its complicated constitution does not allow a compact and slim structure, so that installation of the mirror adjustment mechanism within mirror housing becomes difficult.

Thirdly, a conventional mirror adjustment mechanism comprises a joint structure in which an adjustment member is combined with a mirror holder (or an adaptor) in ball-socket manner, whereby the mirror is adjusted as the mirror holder (or the adaptor) is rotated by the adjustment member. However, such a joint structure via a ball-socket is weak to vibrations and has a low combining strength so that the adjustment member is easily removed from the mirror holder (or the adaptor) by an external impact.

Fourthly, a conventional outside mirror assembly requires additional work such as soldering, etc. for establishing an electric contact for each electric components such as driving motor, mirror position sensor, etc. in the assembling process thereof which is troublesome.

SUMMARY OF THE INVENTION

The present invention, being conceived to solve the above problems, aims to provide a mirror assembly with a compact and slim structure, allowing a precise adjustment of the mirror over a wider adjustment angle.

Another object of the present invention is to provide a mirror assembly having a joint structure that combines an adjustment member and a mirror holder (or an adaptor) more firmly, allowing easy installation of a driving motor or a mirror position sensor.

BRIEF DESCRIPTION OF THE INVENTION

In order to achieve the above objects, the present invention provides an automotive outside mirror assembly installed at each side of an automobile right in front of each front door thereof, comprising a housing, a mirror mounted rotatably at a front opening of the housing, and a mirror adjustment mechanism installed in the housing for adjusting the mirror to a desired angle, wherein the mirror adjustment mechanism comprises, a lower base fixed at a specified position in a mirror housing; an upper base having a partial sphere shape center part, to be combined with upper part of the lower base; a driving unit to be installed between the upper base and the lower base, consisting of two driving motors and two adjustment members each of which is geared with the corresponding driving motor via gear train, wherein the adjustment members are formed in arc shape and comprise a cylindrical joint at each upper end thereof; an adaptor including a partial sphere shape center part, a plane part formed externally from the center part, wherein lower part of the plane part includes two orthogonally positioned first socket grooves into which each corresponding cylindrical joint of the adjustment members is inserted to be combined by a hinge, and two second socket grooves formed at opposite positions to each first socket groove; a pivot link which is installed between center parts of the upper base and the adaptor to limit the adaptor to make rotation movements around a first rotation axis and a second rotation axis formed orthogonal to each other on plane part of the adaptor; a pivot cup comprising a hemisphere part that fits into center part of the adaptor as well as a post formed to protrude externally from the center of the hemisphere part, wherein two combination protrusions are provided at both sides of free end of the post; a spring retainer with which combination protrusions of the pivot cup are combined by a turn movement; a spring which is mounted pressurized between the lower base and the spring retainer as the pivot cup is combined with the spring retainer by a turn movement; and a mirror position sensor unit to be mounted on upper side of the lower base, consisting of a variable resistance circuit having two resistance elements at both terminals thereof, two contact movers sliding on each resistance element; two guide frames guiding movements of each contact mover; and two rods combined by a hinge with each contact mover at each lower terminal thereof while combined by a ball-socket with each second socket groove of the adaptor at each upper terminal thereof.

Preferably, upper part of the lower base comprises a power supply pattern having electric contacts for connection with electrodes of the driving motor and terminals for connection with an external power source.

Preferably, connectors for connection with terminals at one side of the variable resistance circuit are provided at an upper part of the lower base.

Preferably, a sealing member made of an elastic material is additionally provided around the adaptor and the lower base.

Preferably, the contact movers and guide constructions of the guide frames are shaped to have a polygonal cross-section.

Preferably, hinge combination structures of the rods and the contact movers are formed on the first rotation axis and the second rotation axis, respectively, and axes of the hinge combination constructions are formed orthogonal to the first rotation axis and the second rotation axis, respectively.

DETAILED DESCRIPTION OF THE INVENTION

The preferred embodiments of the present invention are described below in detail making reference to the accompanying drawings.

FIGS. 1 through 9 show the automotive outside mirror assembly in accordance with an embodiment example of the present invention.

Figure 1:
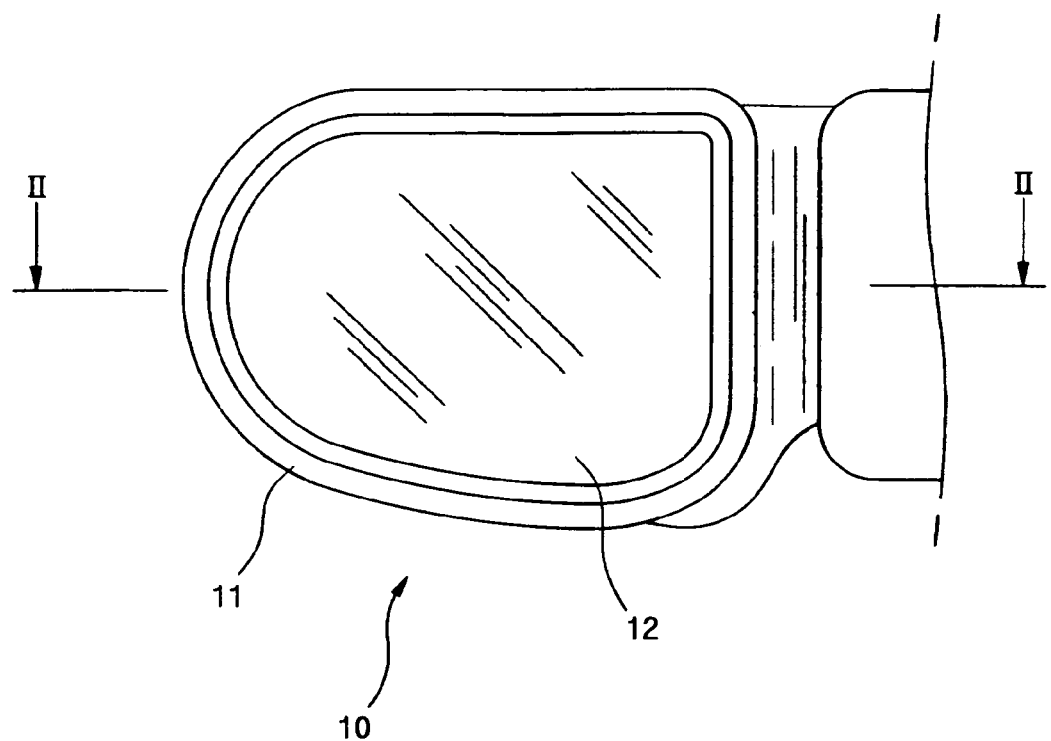
FIG. 1 is a front view showing a common automotive outside mirror assembly as installed at an automobile.

As shown in FIG. 1, a mirror assembly 10 to be installed at each side of an automobile right in front of each front door thereof, comprises a housing 11, a mirror 12 mounted rotatably at a front opening of the housing 11, and a mirror adjustment mechanism 15 installed in the housing 11 for adjusting the mirror 12 to a desired angle.

Figure 2:
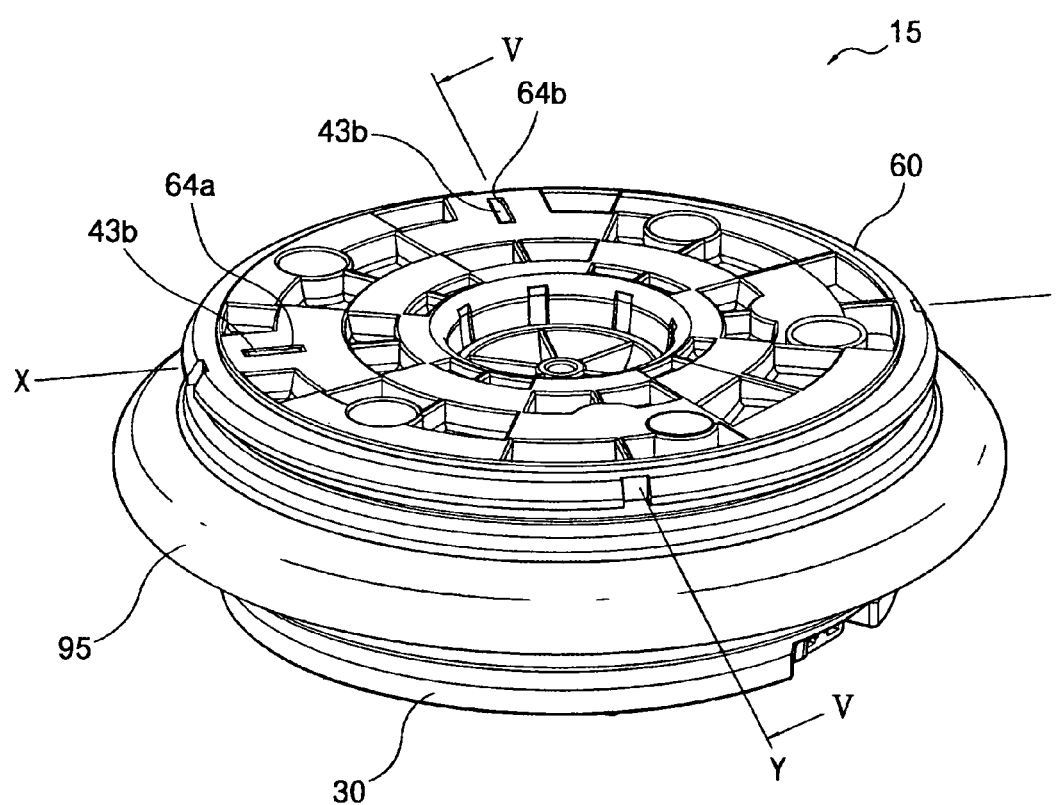
FIG. 2 is a perspective view showing a mirror adjustment mechanism in accordance with an embodiment example of the present invention.
Figure 3:
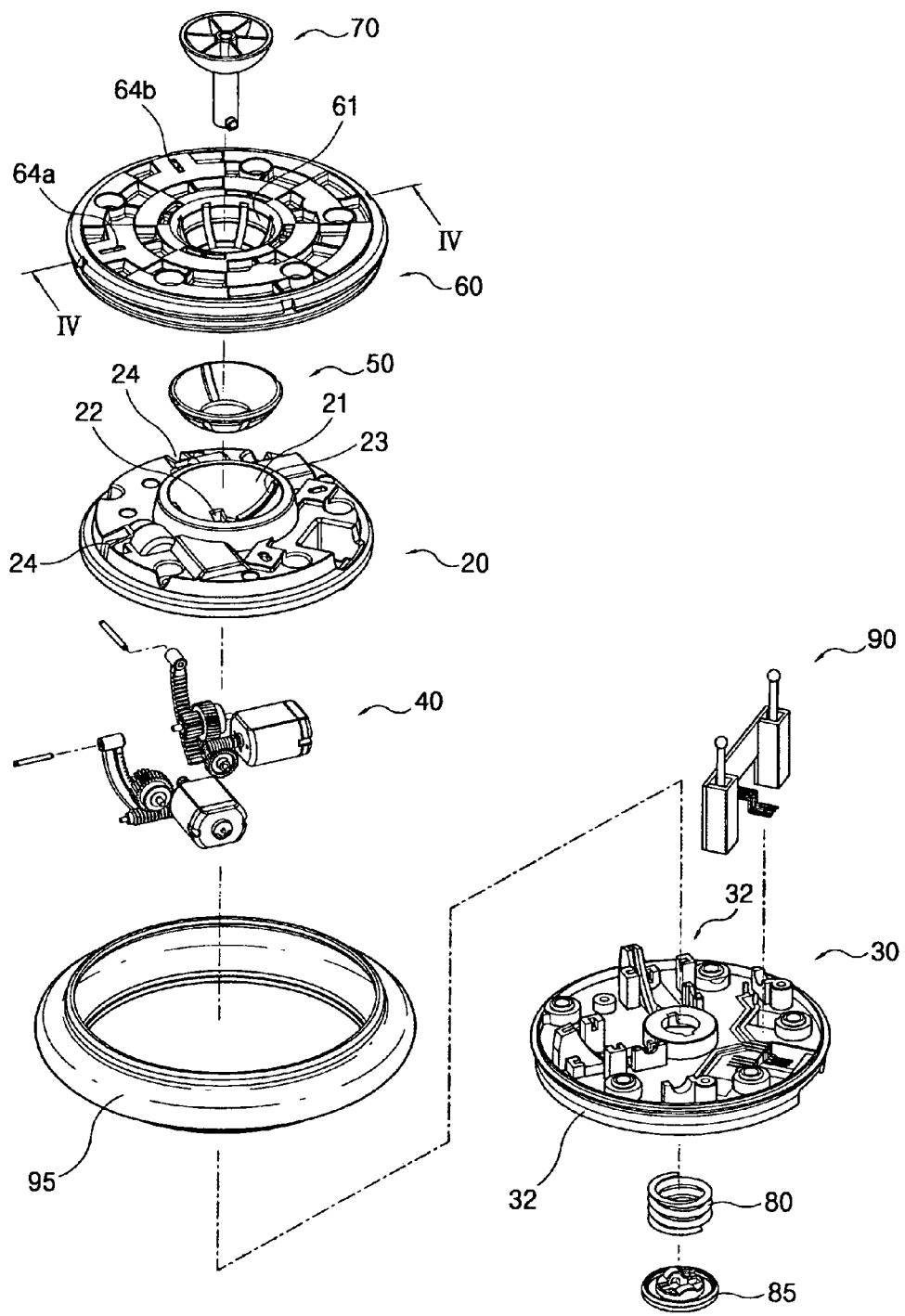
FIG. 3 is an exploded perspective view of a mirror adjustment mechanism in accordance with an embodiment example of the present invention.

The mirror adjustment mechanism 15 comprises, as illustrated in FIGS. 2 and 3, an upper base 20, a lower base 30, a driving unit 40, a pivot link 50, an adaptor 60, a pivot cup 70, a spring 80, a spring retainer 85, and a mirror position sensor unit 90.

Figure 6:
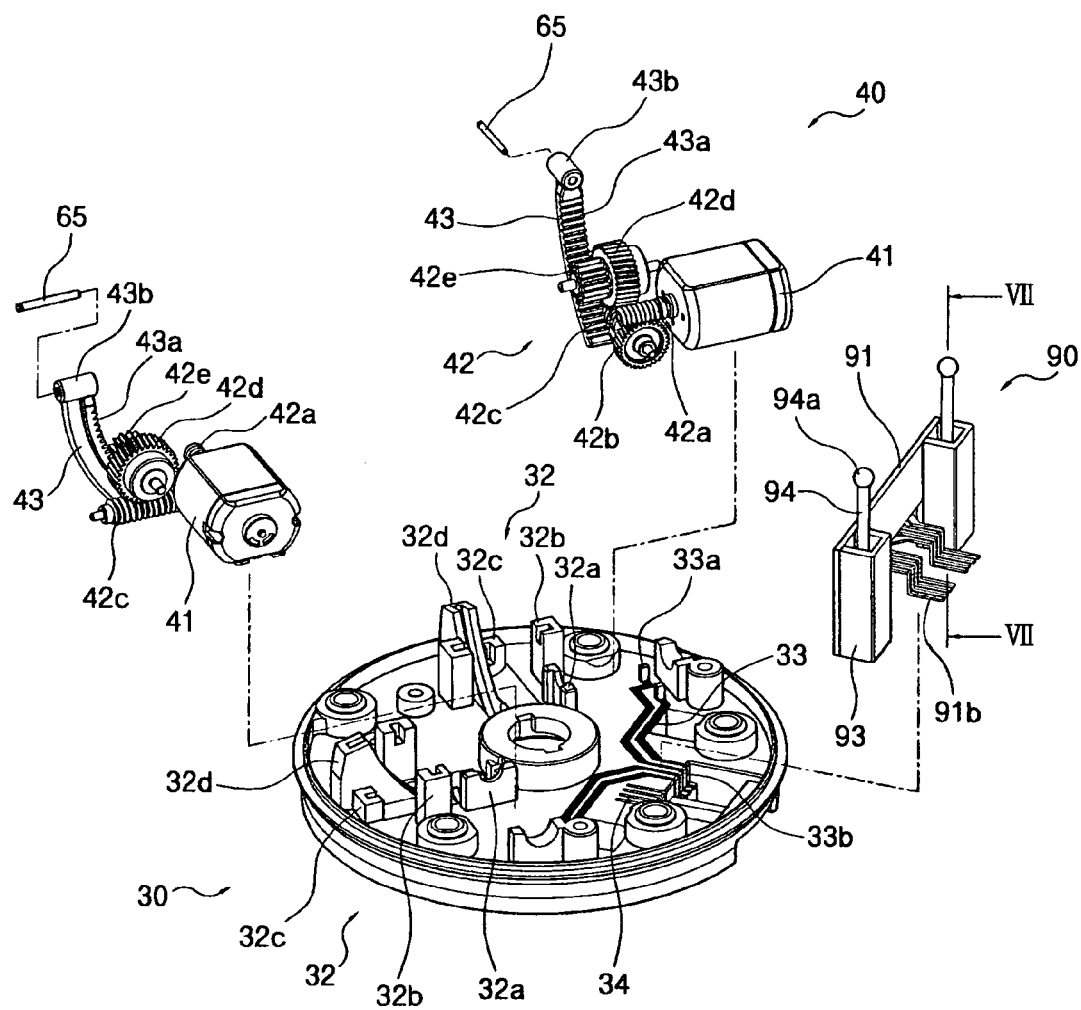
FIG. 6 is an exploded perspective view showing a lower base, driving unit, and a mirror position sensor unit in accordance with the present invention.
Figure 7:
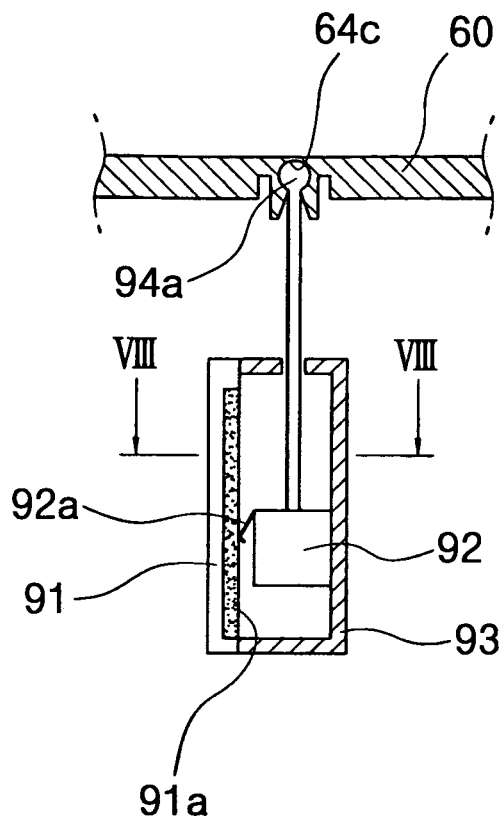
FIG. 7 is a side cross-sectional view of the mirror position sensor unit taken along line VII—VII in FIG. 6.
Figure 8:
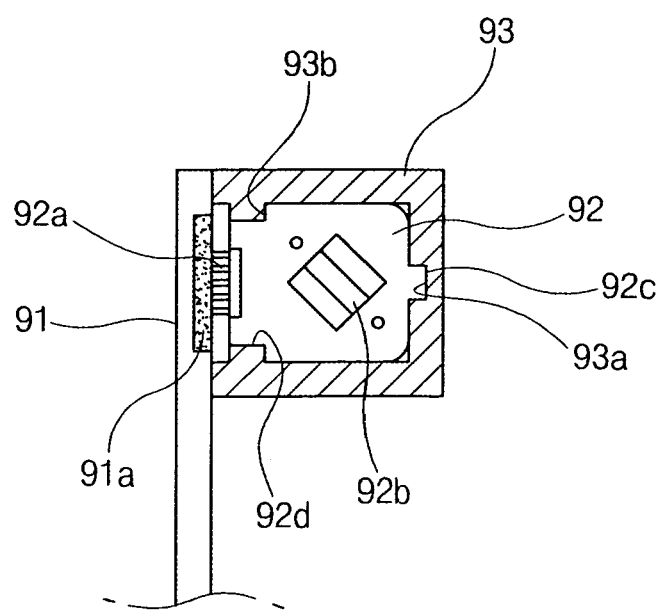
FIG. 8 is a plane view of a contact mover taken along line VIII—VIII in FIG. 7.

As shown in FIGS. 3 and 6, the lower base 30 to be fixed at specified positions in the housing 11 comprises, two fitting units 32 formed orthogonally to each other, on which components of driving unit 40 to be explained herein later are installed, wherein each fitting unit 32 includes a plurality of fitting projections 32a, 32b, 32c as well as guide projections 32d into which an adjustment member 43 is inserted and then guided.

Preferably, upper part of the lower base 30 comprises a power supply pattern 33 having electric contacts 33a for connection with electrodes of driving motors 41 and terminals 33b for connection with an external power source. Thus, additional soldering works for establishing electric connections in installation of driving motors 41 become unnecessary and installation of driving motors 41 is much eased in the present invention, as electrodes of the driving motors need just to be contacted to electric contacts 33a of a power supply pattern 33.

As shown in FIGS. 3 and 6, the driving unit 40 comprises two driving motors 41 and two adjustment members 43, each of which is geared to an output axis of the driving motor 41 through specified gear train 42.

Each driving motor 41 is mounted on a fitting projection 32a of the fitting unit 32 on the lower base 30 in a manner that electrodes of the driving motor 41 contact the electric contacts 33a of the power supply pattern 32 on the lower base 30.

The gear train 42 comprises a first worm screw 42a provided at the output axis of the driving motor 41, a driving gear 42b geared with the first worm screw 42a, a second worm screw 42c fixed coaxial to the driving gear 42b, a clutch driving gear 42d geared with the second worm screw 42c, and a pinion gear 42e that allows slip movements in frictional contact with the clutch driving gear 42d, wherein axis of each gear 42a, 42b, 42c, 42d, 42e is mounted rotatably in the fitting projections 32b, 32c of the fitting unit 32 on the lower base 30.

The adjustment member 43 formed as an arc with specified radius of curvature, includes gear teeth 43a fitting to the above pinion gear 42e formed on inner surface thereof, and comprises a cylindrical joint unit 43b whose center is penetrated on upper terminal thereof, whereby the adjustment member 43 is fitted to the upper part of the guide projection 32d on the lower base 30, and then guided along the guide projection 32d.

Although the driving unit 40 is normally driven by an external power source, it is designed to allow manual driving of the mirror 12 as well, by providing a slip movement between the clutch driving gear 42d and the pinion gear 42e.

Figure 4:
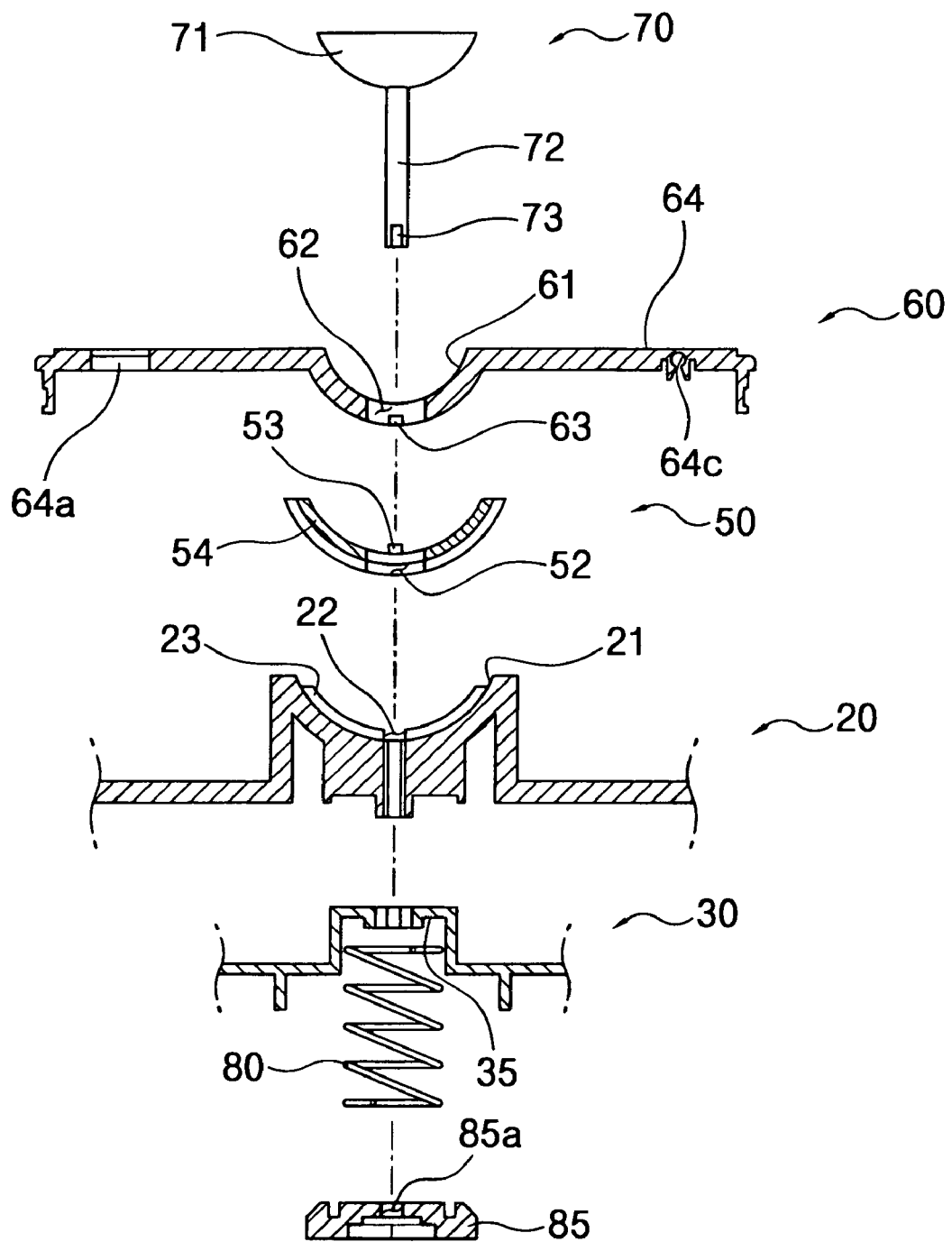
FIG. 4 is a partial (without the driving unit) exploded cross-sectional view taken along line IV—IV in FIG. 3.

As shown in FIGS. 3 and 4, the upper base 20 to be combined with upper part of the lower base 30, has a partial sphere shape center part 21, in the middle of the center part 21 an opening 22 corresponding to free end of the post 51 of the pivot cup 40 to be explained herein later is formed, and on the surface of the center part 21 a rib 23 is formed extending from the opening 22 to the circumference of the center part 21. Furthermore, two through holes 24 are formed orthogonally to each other on the circumference area of the upper base 20, to allow the above adjustment members 43 of the driving unit 40 to be installed through these holes 24.

As shown in FIGS. 3 and 4, the adaptor 60 includes a partial sphere shape center part 61, an opening 62 formed in the middle of the center part 61, a channel 63 formed on the lower part of the center part 61 extending externally from the opening 62, and a plane part 64 formed externally from circumference of the center part 61. On lower surface of the plane part 65 of the adaptor 60, two cylindrical first socket grooves 64a, 64b are formed positioned orthogonally to each other, into which joint members 43b of the above adjustment members 43 are combined by hinges 65. Two spherical second socket grooves 64c, 64d are formed at opposite positions to each first socket grooves 64a, 64b on the same axes thereof, with which ball joint units 94a provided at each upper end of the rods 94 of the mirror position sensor unit 90 to be explained herein later are combined. Moreover, rear side of the mirror 12 is tightly combined with upper part of the plane part 64 of the adaptor by a mirror holder (not shown).

Figure 9:
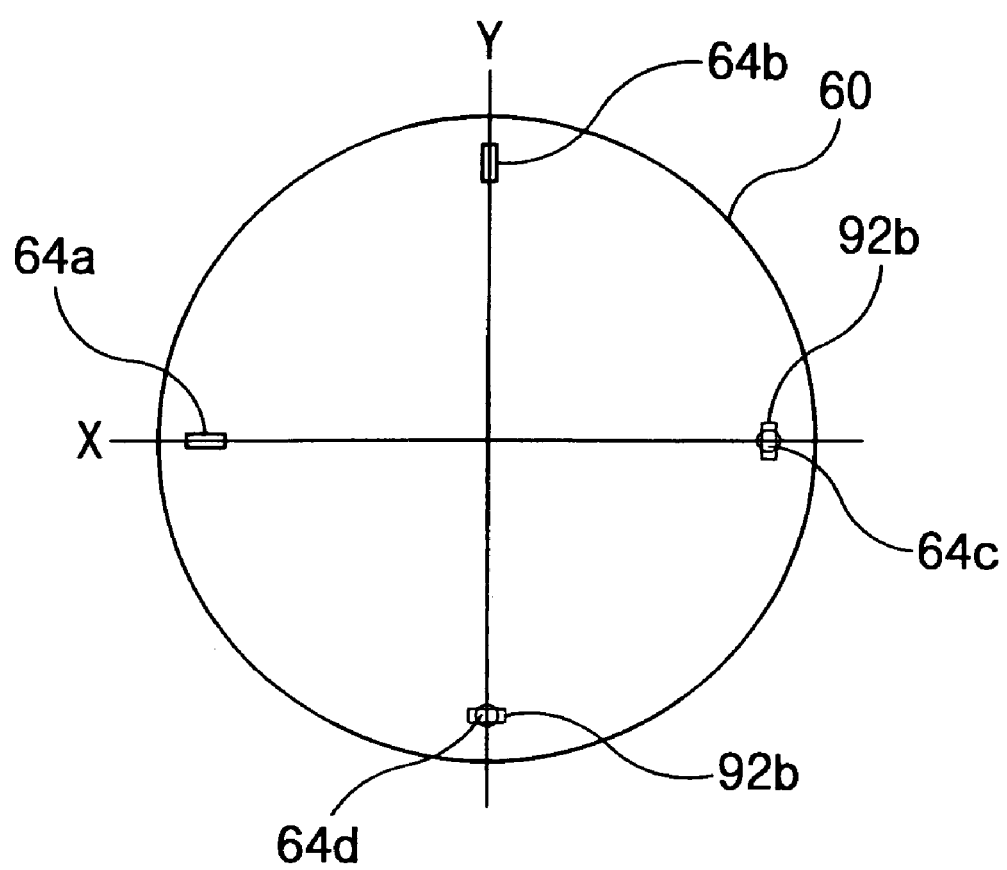
FIG. 9 is a schematic view illustrating correlation between the first as well as second rotation axis and the mirror position sensor unit on the plane of the adaptor.

As illustrated in FIG. 9, connection line between the first socket groove 64a and the second socket groove 64c functions as a first rotation axis X, while connection line between the first socket groove 64b and the second socket groove 64d functions as a second rotation axis Y.

As the cylindrical joint units 43b of the adjustment members 43 are combined with the first socket grooves 64a, 64b of the adaptor 60 by hinge pins 65 in the present invention, and thus, an improvement in the combining strength and stability against vibrations has been achieved in contrast to the conventional ball-socket combination between an adjustment member and an adaptor (or a mirror holder), the present invention can effectively prevent an undesired removal of a joint unit 43b of an adjustment member 43 from an adaptor 60 by an external impact.

Further, as an arc shape adjustment member 43 with specific radius of curvature moves along the above radius of curvature in the present invention, and thus, a wider angle (approximately 30° or more) of mirror adjustment can be provided in contrast to a possible mirror adjustment angle (approximately 20° to 25°) of the conventional art, a wider left/right as well as rear view can be provided to a driver.

In addition, the present invention can drastically reduce the dimensions of the upper base 20, of the lower base 30, and of the adaptor 60 due to its specific combination of the arc shape adjustment member 43 and the adaptor 60, and thus, can realize a compact and slim structure of the mirror adjustment mechanism.

Figure 5:
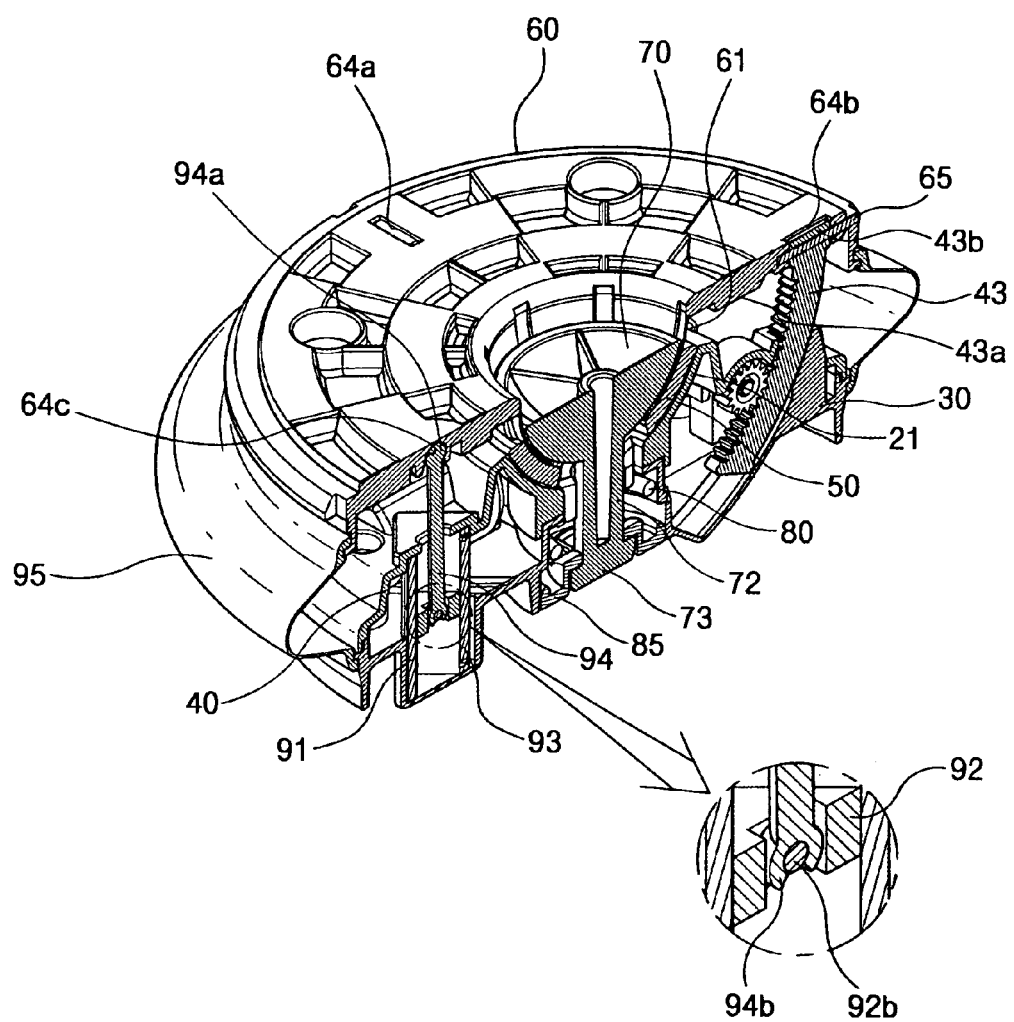
FIG. 5 is a partial perspective view taken along line V—V in FIG. 2.

As shown in FIGS. 4 and 5, the pivot link 50 is shaped as a partial sphere corresponding to center part 21 of the upper base 20 and to center part 61 of the adaptor 60 to allow fitting thereof between center part 21 of the upper base 20 and center part 61 of the adaptor 60, with an opening 52 formed in the middle thereof On upper part of the pivot link 50 a rib 53 is formed extending from the opening 52 to circumference thereof, while on lower part of the pivot link 50 a channel 54 is formed extending from the opening 52 to circumference thereof, wherein the rib 53 and the channel 54 are positioned orthogonal to each other.

Then, rib 23 of the upper base 20 is fitted to the channel 54 of the pivot link 50 so that the pivot link 50 and the upper base 20 are guided by one another, whereby the adaptor 60 is limited to rotate around the first rotation axis X.

Furthermore, channel 63 of the adaptor 60 is fitted to the rib 53 of the pivot link 50 so that the pivot link 50 and the adaptor 60 are guided by one another, whereby the adaptor 60 is limited to rotate around the rotation axis Y By the above construction, wherein rib 23 of the upper base 20 and channel 54 of the pivot link 50 are mutually fitted and guided, and rib 53 of the pivot link 50 and channel 63 of the adaptor 60 are mutually fitted and guided, the adaptor 60 and the mirror 12 are limited to rotate around the orthogonally positioned first rotation axis X and second rotation axis Y.

However, the above described limited rotation structure of the present invention is not limited to the above descriptions, but rather, allows other variations.

As shown in FIGS. 4 and 5, the pivot cup 70 comprises a hemisphere part 71 that fits into center part 61 of the adaptor 60 as well as a post 72 formed to protrude externally from the hemisphere part 71, wherein two combination protrusions 73 are provided at both sides of free end of the post 72.

The spring retainer 85 comprises in center thereof an opening 85a shaped to correspond to the free end of the pivot cup 70, through which combination protrusions 73 of the pivot cup 70 penetrate to finally be combined with the spring retainer 85 by a turn movement, whereby the spring 80 to be inserted into the fitting seat 35 at bottom of the lower base 30 is pressed by the spring retainer 85.

Since such a turn combination structure of a spring retainer 85 with a pivot cup 70 is described in detail in Korean Patent Application No. 10-2003-0048765 filed by the applicant of the present invention, a further description of construction and function thereof is omitted here.

The mirror position sensor unit 90, which is constructed by modulizing two potentiometers into a single unit, enables an easy assembly as well as installation, and at the same time, enhances the operation accuracy.

Preferably, the mirror position sensor unit 90 to be combined with upper side of the lower base 30, comprises a variable resistance circuit 91 having two resistance elements 91a at both terminals thereof, two contact movers 92 each sliding on the resistance element 91a; two guide frames 93 each guiding movements of the contact mover 92; and two rods 94 combined by a hinge with the contact mover 92 at each lower terminal while combined by a ball-socket with the second socket groove 64c, 64d of the adaptor 60 at each upper terminal 94b, as shown in FIGS. 5 through 8.

The variable resistance circuit 91 to be installed on upper surface of the lower base 30, includes two resistance elements 91a at both terminals thereof Preferably, the variable resistance circuit 91 includes at one end thereof terminals 91b for establishing electric contacts with the connectors 34 on upper part of the lower base 30. With such a construction, the additional soldering works required in the conventional art for establishing electric contacts between these components will be unnecessary, so that assembling and installation processes are much eased.

The contact movers 92 comprise a metallic contactor 92a at one side thereof, and a cylindrical hinge axis 92b is formed monolithic in inner center thereof The contactor 92a of the contact mover 93 senses rotation position of the mirror 12 by sliding on each resistance element 91a of the variable resistance circuit 91. A hinge unit 94b at bottom part of the rod 94 to be explained later is combined with hinge axis 92b of the contact mover 92 by a hinge.

The guide frame 93 is designed to guide movements of the contact mover 92, in other words, the contacting surface of the guide frame 93 to the contact mover 92 is equipped with a plurality of guide grooves and guide protrusions 93a, 93b, 92c, 92d to enable precise guidance of the movements.

Further, it is preferable that the guide structure between the guide frame 93 and the contact mover 92 has a polygonal cross-section such as a triangle, a rectangular, etc. to achieve a more accurate guidance of the contact mover 92 as well as a more correct sensing of the mirror 12 position.

The rod 94 comprises a ball joint 94a at upper end thereof and a cylindrical hinge 94b having a incised lower end at lower end thereof The ball joint 94a at upper end of the rod 94 is combined by a ball-socket with second socket grooves 64c, 64d of the adaptor 60, while the hinge 94b at lower end of the rod 94 is combined by hinge with hinge axis 92b of the contact mover 92. As shown in FIG. 9, hinge combination structures between hinge 94b of the rod 94 and hinge axis 92b of the contact mover 92 shall preferably be arranged on the first rotation axis X and the second rotation axis Y, and axes of the hinge combination structures between the rod 94 and the contact mover 92 shall preferably be arranged orthogonal to the first rotation axis X and the second rotation axis Y respectively.

In the above construction of mirror position sensor unit 90, as the adaptor 60 rotates, upper part of the rod 94 makes a same movement as the adaptor 60, while the contact mover 92 combined with lower part of the rod 94 makes a vertical up/down movement along the guide frame 93, whereupon contactor 92a of the contact mover 92 slides on surface of resistance element 91a of the variable resistance circuit and senses only vertical displacement among rotation displacement of the mirror 12.

A mirror adjustment mechanism in accordance with the present invention can further comprises a sealing member 95 made of an elastic material that tightly seals the side space between the adaptor 60 and the lower base 30, so that the space between the adaptor 60 and the lower base 30 can effectively prevented from intrusion of a foreign substance from outside.

A description of operation of a mirror adjustment mechanism with above construction is now given below.

As the driving motors 41 of the driving unit 40 are applied with power the driving motors 41 operate, whereupon the adjustment members 43 geared with the driving motors 41 through gear trains 42 move by a specified radius of curvature. By driving of the adjustment members 43, the adaptor 60 makes a limited rotation movement around the first and the second rotation axis X, Y based on the above described limited rotation structure (adaptor 60, pivot link 50, rib and channel guidance structures of the upper base 20), whereupon the mirror 12 which is tightly combined with upper part of the adaptor 60 makes a limited rotation movement, whereby an adjustment of the mirror 12 to a desired rotation position is made.

Such a rotation position of the mirror 12 as adjusted by the driving unit 40 is sensed by the mirror position sensor unit 90, the sensed information is then transmitted to a mirror position controller (not shown) installed in a cabin, and the mirror position controller (not shown) controls each driving motor 41 based on the transmitted information.

INDUSTRIAL APPLICABILITY

The present invention provides a mirror assembly with a compact and slim structure, allowing a precise adjustment of the mirror over a wider adjustment angle.

The present invention provides further a mirror assembly having a joint combination structure that combines an adjustment member and a mirror holder (or an adaptor) more firmly, allowing easy installation of a driving motor or a mirror position sensor.

Although the present invention has been described above with respect to the preferred embodiments, the scope of rights of the present invention is not limited thereto, but rather shall be determined by the appended claims and their equivalents, allowing various modifications, adaptations, etc. without departing the spirit of the invention, as those skilled in the art will understand.

What is claimed is:

1. An automotive outside mirror assembly installed at each side of an automobile right in front of each front door thereof, comprising a housing, a mirror mounted rotatably at a front opening of said housing, and a mirror adjustment mechanism installed in said housing for adjusting said mirror to a desired angle, wherein the mirror adjustment mechanism comprises, a lower base fixed at a specified position in the mirror housing;

an upper base having a partial sphere shape center part, to be combined with upper part of said lower base;

a driving unit to be installed between said upper base and said lower base, consisting of two driving motors and two adjustment members each of which is geared with a corresponding driving motor via gear train, wherein said adjustment members are formed in arc shape and comprise a cylindrical joint at each upper end thereof;

an adaptor including a partial sphere shape center part, a plane part formed externally from said center part, wherein the lower part of said plane part includes two orthogonally positioned first socket grooves into which each corresponding cylindrical joint of said adjustment members is inserted to be combined by a hinge, and two second socket grooves formed at opposite positions to each first socket groove;

a pivot link which is installed between center parts of said upper base and said adaptor to limit said adaptor to make rotation movements around a first rotation axis and a second rotation axis formed orthogonal to each other on said plane part of the adaptor;

a pivot cup comprising a hemisphere part that fits into center part of said adaptor as well as a post formed to protrude externally from the center of said hemisphere part, wherein two combination protrusions are provided at both sides of free end of said post;

a spring retainer with which said combination protrusions of said pivot cup are combined by a turn movement;

a spring which is mounted pressurized between said lower base and said spring retainer as said pivot cup is combined with said spring retainer by a turn movement; and a mirror position sensor unit to be combined with upper side of said lower base, consisting of a variable resistance circuit having two resistance elements at both terminals thereof; two contact movers sliding on each resistance element; two guide frames guiding movements of each contact mover; and two rods combined by a hinge with the contact mover at each lower terminal thereof while combined by a ball-socket with the second socket groove of said adaptor at each upper terminal thereof.

2. The mirror adjustment mechanism of claim 1, wherein upper part of said lower base comprises a power supply pattern having electric contacts for connection with electrodes of the driving motor and terminals for connection with an external power source.

3. The mirror adjustment mechanism of claim 1 or claim 2, wherein connectors for connection with said terminals at one side of said variable resistance circuit are provided at an upper part of said lower base.

4. The mirror adjustment mechanism of claim 3, wherein a sealing member made of an elastic material is additionally provided around said adaptor and said lower base.

5. The mirror adjustment mechanism of claim 3, wherein said contact movers and guide constructions of said guide frames are shaped to have a polygonal cross-section.

6. The mirror adjustment mechanism of claim 3, wherein hinge combination structures of said rods and said contact movers are formed on the first rotation axis and the second rotation axis, respectively, and axes of said hinge combination structures are formed orthogonal to said first rotation axis and said second rotation axis, respectively.

* * * * *